July 4, 1944.  J. F. O'BRIEN  2,352,654
ELECTRICITY CONDUCTOR UNIT
Filed Oct. 2, 1941  2 Sheets-Sheet 2
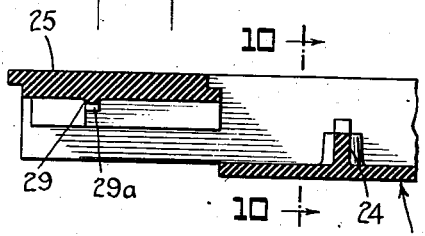
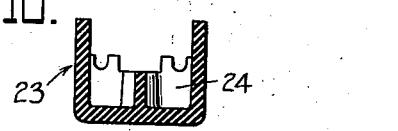
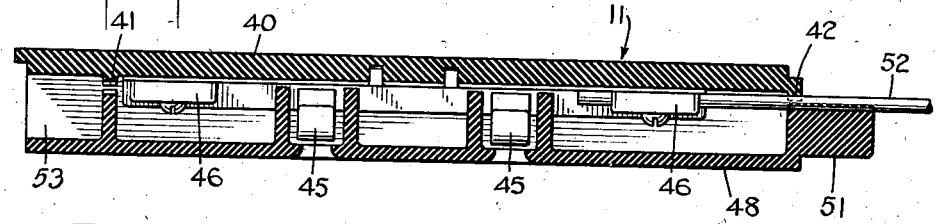
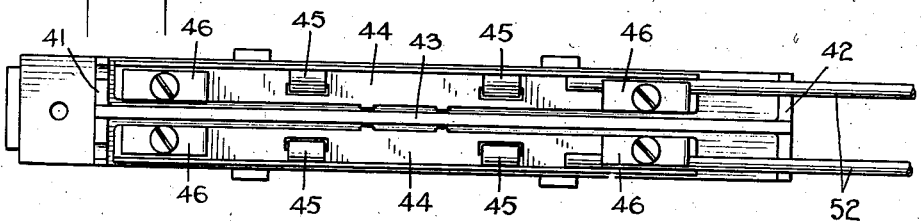
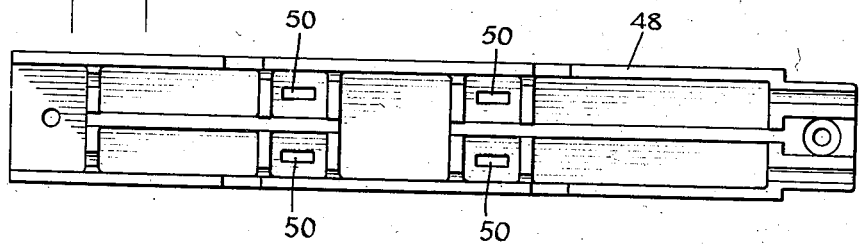
INVENTOR
Joseph F. O'Brien
BY
HIS ATTORNEY Patented July 4, 1944

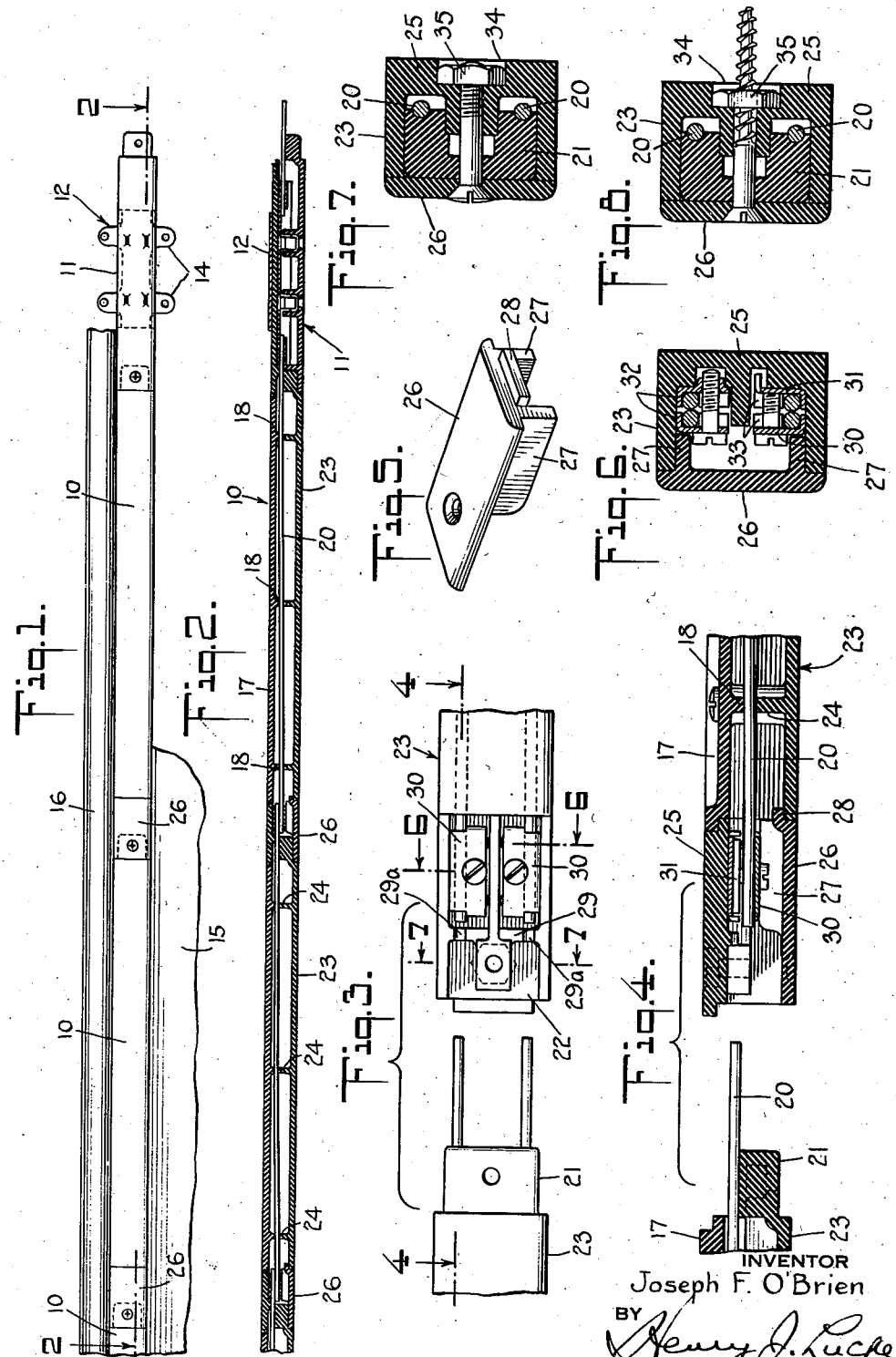

2,352,654

UNITED STATES PATENT OFFICE 2,352,654

ELECTRICITY CONDUCTOR UNIT

Joseph F. O'Brien, Jersey City, N. J., assignor to John B. Pierce Foundation, New York, N. Y., a corporation of New York Application October 2, 1941, Serial No. 413,251

13 Claims. (Cl. 173—334.1)

This invention relates to electricity conductor units of relatively short length arranged in seriatim electrical and mechanical association to form an electric wiring system.

It is an object of the present invention to provide an improved electricity conductor unit which is low in manufacturing cost and cost of installation.

It is an object of the invention to provide an electricity conductor unit having end configurations adapted for an interfitting, socket, interconnection, wherein projecting conductors of one unit overlie conductors of an adjacent unit and are connected thereto to afford electric communication therewith.

It is an object of the invention to provide an electricity conductor unit wherein the terminal ends of one unit are arranged in a different plane from the terminal ends of the conductors of an adjacent unit, pursuant to which construction the conductors of said second unit may be inserted into the first unit to lie side by side with the conductors of such first unit.

In a preferred form of the present invention, the electricity conductor unit comprises a substantially hollow body within which are mounted in mutually insulated, spaced relationship, relatively rigid electrical conductors, uninsulated at their end portions. Wall means of the body of the unit cooperate with the electricity conductors therein to raise one end of the conductors, giving to said conductors a predetermined degree of slope within the body. The conductors of an adjacent unit have projecting terminals arranged in a plane which permits said conductors to be introduced into the first unit to lie beneath said first unit conductors in surface contact therewith. Clamping means or equivalent are provided in such first unit to clamp the conductors of the first and second units together to form the electrical connection. The raised ends of the conductors of the first unit hold them above the level of the extending conductors of the second unit, and thereby make it unnecessary for the mechanic to manually lift the conductors or the clamping means of such first unit during the stage of insertion and interconnection of the conductors of the second unit, thereby expediting the work of installing the units.

Other features and advantages will hereinafter appear.

In the accompanying drawings:

Fig. 1 is an elevation of a portion of an electric wiring system embodying the present invention;

Fig. 2 is a sectional elevation of the same, taken on lines 2—2 of Fig. 1;

Fig. 3 is a plan view of adjacent conductor units of the wiring system in position approaching the interconnected position thereof;

Fig. 4 is a sectional elevation of the units taken on line 4—4 of Fig. 3;

Fig. 5 is a perspective of a closure cap for the socket end of a conductor unit;

Fig. 6 is a sectional elevation taken on lines 6—6 of Fig. 3;

Fig. 7 is a sectional elevation taken on lines 7—7 of Fig. 3;

Fig. 8 is a view similar to Fig. 7 but showing the manner in which a wood screw may be employed to secure interconnected units and to fasten such units to a wall;

Fig. 9 is an enlarged sectional elevation of a portion of the cover member of a unit at the socket end thereof;

Fig. 10 is an end elevation taken at section 10—10 of Fig. 9;

Fig. 11 is a section taken through an outlet-provided unit;

Fig. 12 is a plan view of said outlet-provided unit with the cover removed; and

Fig. 13 is a rear plan view of the cover portion thereof.

In the form represented in Fig. 1, an electrical wiring system may include a series of conductor units 10, 10, 10 electrically and mechanically interconnected, as later described, and an outlet-provided unit 11. With such outlet unit 11 is shown a saddle or clip 12, removably attached thereto and having a suitable plurality of ears 14 which are positioned behind the baseboard 15 and molding strip 16 to hold the run of units in place on such baseboard.

Each unit 10 may be formed from complementary base and cap members, held together by such means as self-tapping screws or the like. The base member 17 may be molded from suitable plastic materials of requisite structural and insulation qualities, in the form of a substantially hollow structure having relatively low sloping sides and a suitable plurality of desirably integral transverse walls 18, 18, 18. The transverse walls have spaced grooves to receive electricity conductors 20 in mutually insulated, uniformly spaced relationship. As appears from Figure 2, the transverse walls 18 are of variant height to provide for a slope of the conductors 20 from the male end 21 of a unit upwardly to the socket end 22 thereof. To insure a permanent "set" or slope of the conductors 20, said conductors are of relatively heavy, rigid, wires, rods, or tubes, uninsulated at their terminal ends.

The cap member 23, also molded from suitable insulation materials and given any desired configuration to simulate molding or structural trim, has a front, or facing wall and downwardly depending side walls between which the base member 17 fits, and a plurality of transverse walls 24, matching in number the walls 18, and grooved to cooperate with the grooves in the base walls 18 to form passages for the securement of the conductors 20, and complementing the variant height of the transverse walls 18 to provide for the stated slope of the conductors.

It will be noted from Figures 2 and 9 that the male projection end 21 of the unit is an integral portion of the cap member 23, as is a rear wall 25 at the socket end 22. Said rear wall 25 forms a base upon which the male end 21 and the extending conductors 20 rest. By forming the male end 21 and the rear wall 25 as integral members of the cap, it is obvious that correct interfitting of the male and socket ends of adjacent units is assured.

At the socket end, the cap member has an open top into which fits a removable closure plate 26 having depending side walls 27, 27 and a lip 28 which fits beneath the forward edge of the front wall to form a joint which precludes accidental access to the conductors.

The socket end of the cap member is defined by a suitably grooved transverse wall 29, immediately behind which are disposed conductor clamping members 30, 31. Said conductor clamping members may be of similar shape but opposite hand, as shown in Figure 6, and each may be defined by downwardly extending side walls 32 and end walls 33, 33. The clamping member 30 is formed with an aperture, in registry with which member 31 has a threaded boss for the accommodation of a machine screw.

From Figure 6 it will be noted that the relative position of the end walls and side walls of the clamping members form openings of suitable size at each end, to snugly accommodate the respective conductors 20 of the interconnected units.

Referring to Figures 3 and 4, it is seen that the conductors 20 of a unit 10 project from the end face of the unit at the male end thereof, the extent of such projection providing for an overlapping of the conductors of adjacent units for substantially the full length of the clamping means.

In assembling a conductor unit 10, the electricity conductors 20 thereof may be laid upon the transverse walls 24 of the cap member 23. It will be noted that although each conductor 20 has a length substantially equal to the length of the unit 10, the conductors are arranged to extend suitably beyond the male end 21 of the cap 23. The base member 17 is then placed in position and the grooves in the transverse walls 18 thereof cooperate with the grooves in the walls 24 in which the conductors rest to secure said conductors against lateral displacement. The cap and base members may be fastened together by means of self-tapping screws or the like. Temporarily, the cap 26 at the socket end of the unit may be omitted. At the male end of a unit, the transverse walls 18 and 24, respectively, of the base and cap members cooperate with the conductor-supporting surface of the male extension 21 to assure that the conductors 20 and the projecting ends thereof are in parallelism with the rear wall 25 of the unit and so position the projecting ends of the conductors 20 that such conductors will slide into and above the clamping member 31 of an adjacent unit.

A feature of this invention is that the slope of the conductors at the socket end of the unit positions such conductors and the upper clamping device 30 thereof above the complementary clamp member 31 to facilitate the insertion of the projecting ends of the conductors of an adjacent unit therebeneath. Such arrangement simplifies the mechanical operations incident to the electrical interconnection of adjacent units because it eliminates the necessity of manually raising the clamping member 30, or holding said clamping member in raised position during the stage of the interconnection of the respective conductors.

In interconnecting a succession of units 10, one unit is placed in position with the cap 26 removed, and the next succeeding unit is aligned with the first and moved toward it to bring the projecting conductors beneath the conductors of the first unit. The grooves 29a in the wall 29 at the socket end of the first unit serve to align and guide the projecting conductors of the adjacent unit so that they will pass under the raised conductors of the first unit and into clamping position, whereupon the clamping means may be brought into position to securely clamp the respective conductors together over a relatively long area of engagement. The closure plate 26 may then be placed in position, to enclose the conductors in the area of their attachment.

As appears from Figures 3, 7, and 8, the male and socket portions of adjacent conductor units are provided with matching apertures through which a machine or wood screw may be passed to secure a run of units to the wall. For use with the machine screw, the under portion of the socket end may be formed with a polygonal depression 34 into which the nut 35 frictionally fits. Desirably the size of the machine screw and nut is such that a suitable wood screw may pass through the nut 35, rendering it unnecessary to remove the nut in the event it is desired to secure the units by means of a wood screw.

Figures 11 et seq. illustrate an outlet-provided unit 11 for seriatim interconnection with a unit 10 or any desired succession of other outlet units. Said outlet unit includes a base member 40 formed with transverse end walls 41, 42, and a central wall 43, between which transverse and central walls are located bus bars 44, 44, provided with paired contact means 45, 45 and, at the ends, clamping devices 46, 46.

The cap member 48 is three-sided and substantially hollow, and is formed with transverse and longitudinal walls as illustrated, to provide pockets of insulation material within which the contact means 45, 45 are positioned. In suitable registry with such pockets the facing wall of the cap member has apertures 50 to receive the blades of a conventional attachment plug.

It is noted that an end of the cap member 48 forms a projecting member 51 and that at the opposite end the cap and base members cooperate to provide a socket 53 complementary in size and shape with the projection 51.

It will be understood that the projection 51 of the outlet unit 11 matches the male projection of the conductor unit 10, and that the socket portion of such unit 11 is designed to receive the male end 21 of a unit 10. Accordingly, a unit 11 may be arranged intermediate a pair of units 10 or any suitable number of units 11 may be arranged in contiguity to provide a desired number of outlet facilities.

As appears in Figure 12, the bus bars 44 of unit 11 terminate short of the male end and to provide for the electrical interconnection of a unit 11 with a unit 10 or a second unit 11, short lengths of conductors 52 are employed with the clamping means at such male end; said conductors 52 being the equivalent, in spacing and position, to the extensions of the conductors 20 of a unit 10.

Whereas I have described my invention by reference to specific forms thereof, it will be understood that many changes and modifications may be made without departing from the spirit of the invention.

I claim:

1. An electricity conductor unit comprising, in combination, a substantially hollow body of electrical insulation material having top, side, and base walls, a male extension at one end and a complementary socket portion at the other end to afford male and female interconnection of adjacent units; electricity conductors disposed within said body and extending longitudinally thereof, said conductors, at one end, being disposed on a surface of said male extension and at the other end, disposed adjacent said body socket and elevated above the base wall of said socket and above the plane of the conductors at the male extension; wall means within said body uniformly supporting the conductors in such raised position, and conductor-connecting means adjacent said socket, said connecting means including an electrically conductive member disposed substantially in the plane of and in alignment with the male end conductors, and an electrically conductive member supported above said first member by the conductors at the elevated ends thereof, the spacing between the members of said connecting means being substantially equal to the combined thickness of the electricity conductors at the male end and the socket end of the unit.

2. An electricity conductor unit according to claim 1, further characterized by the extension of the electricity conductors beyond the male end of the unit a distance greater than the length of the socket portion of the unit.

3. An electricity conductor unit according to claim 1, further characterized by the socket end of the unit having a transverse wall provided with means to guide the conductors of an adjacent unit into operative position with respect to the conductor-connecting means of the first-mentioned unit.

4. An electricity conductor unit comprising, in combination, a substantially hollow body of electrical insulation material having a base member and a three-sided cap member cooperating therewith to form such hollow body; said cap member having at one end an integral male extension projecting beyond the base member, and at the other end an integral rear wall disposed in the plane of the base member and forming a continuation thereof, said rear wall and the side walls of said cap member cooperating to form a pocket for the accommodation of the male extension of an adjacent unit; clamping means disposed on said rear wall adjacent said pocket; electricity conductors disposed within said hollow body in mutually insulated, spaced relationship, said electricity conductors being disposed on the rear surface of the male extension and extending therefrom and at their opposite ends overlying said clamping means; and wall means in said hollow body for insulatedly supporting said electricity conductors.

5. An electricity conductor unit comprising, in combination, a substantially hollow body of electrical insulation material, said body including a base member and a cap member, said cap member having front and side walls and an integral extension at one end and at its opposite end an integral rear wall cooperating with the front and side walls to form a socket into which the extension of an adjacent cap member will fit upon the seriatim interconnection of adjacent units; wall means disposed interiorly of said body, and electricity conductors arranged on said wall means in mutually insulated, spaced relationship, said electricity conductors terminating at one end in the zone of the rear wall of the cap member but above the surface thereof, and supported on and extending beyond the integral extension of the cap member at the opposite end, the extending portions of the conductors being disposed in the plane of the upper surface of the integral rear wall of said cap member.

6. An electricity conductor unit comprising, in combination, a substantially hollow body of electrical insulation material, having top, side, and base walls, a male extension at one end and a socket at the opposite end of said body providing for a male and female interconnection of similar units; electricity conductors disposed within said body and extending longitudinally thereof, said conductors lying along a surface of said male extension and extending therefrom and at an opposite end being raised above the plane of the base wall and the plane of the conductor extensions at the male end of the unit, wall means arranged internally of said body and supporting said conductors, clamping means at the socket end of the body for clamping together the raised end of the conductors of one unit and the extending conductors of an adjacent unit, and removable cover plate means for said hollow body in the zone of such interconnection.

7. An electricity conductor unit comprising, in combination, a substantially hollow body of electrical insulation material, said body consisting of a base and a cap member removably associated, said cap member having at one end a projecting portion and at another end a transverse base wall; wall means arranged within said body; electricity conductors arranged on said wall means in mutually insulated spaced relationship; terminals of said electricity conductors disposed on said projecting portion and extending therefrom, terminals at the opposite ends of said electricity conductors disposed over said base wall of said body in spaced relationship therewith; the upper wall surface of said base wall and the lower wall surface of said projecting portion being substantially in a common plane.

8. An electricity conductor unit for seriatim interconnection with like units, comprising, in combination, a substantially hollow body of electrical insulation material, said body including a base member and a cap member removably associated therewith, a plurality of transverse walls disposed on said base member interiorly of said hollow body, each of said transverse walls being provided with a notch facing the cap member, said notches being in alignment; a rigid electricity conductor coextensive with the length of the unit, supported on said transverse walls within the said notches thereof; the bases of said notches being progressively farther apart from said base member to cause said conductor to have a substantially uniform slope with respect thereto; and wall means provided on said cap member and engageable with said conductor to hold said conductor in position within said notches.

9. An electricity conductor unit as defined in claim 8, further characterized by the cap member of said unit having an end portion lying in the plane of said base member and provided with a removable cover portion at said end portion of the unit.

10. An electricity conductor unit as defined in claim 8, further characterized by the cap member having at one end an extending portion lying in the plane of the base member and a complementary socket portion at its other end.

11. An electricity conductor unit as defined in claim 8, further characterized by the conductor thereof extending beyond the body of the unit at one end thereof.

12. An electricity conductor unit as defined in claim 8, further characterized by the conductor thereof being rigid and having a permanent set by which the difference in the planes of said conductor at the opposite ends of the unit is substantially uniform.

13. An electricity conductor unit for seriatim electrical connection with like units, comprising, in combination, a polygonal substantially hollow body of electrical insulation material, said body including transverse walls of insulation material disposed within said body, each wall having an aperture for the passage of an electricity conductor therethrough, the apertures of successive walls being substantially in alignment; the apertures through successive transverse walls being spaced progressively farther from a common wall of said hollow body to dispose the extremities of the said conductor in different planes with respect to said common wall.

JOSEPH F. O'BRIEN.